(12) United States Patent
Aboba et al.

(10) Patent No.: US 7,778,170 B2
(45) Date of Patent: Aug. 17, 2010

(54) SPECTRUM AND MEDIUM ACCESS ALLOCATION FOR FAIRNESS

(75) Inventors: Bernard D. Aboba, Bellevue, WA (US); Paramvir Bahl, Sammamish, WA (US); Miguel Oom Temudo de Castro, Cambridge (GB); Gopala S. Narlanka, Bellevue, WA (US); Jitendra D. Padhye, Redmond, WA (US); Bozidar Raduvic, Cambridge (GB); Ramachandran Ramjee, Bangalore (IN); Kun Tan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/939,625

(22) Filed: Nov. 14, 2007

(65) Prior Publication Data
US 2009/0122700 A1    May 14, 2009

(51) Int. Cl.
*H04J 1/16* (2006.01)
(52) U.S. Cl. .................................... 370/230
(58) Field of Classification Search ................ 370/230, 370/229, 235, 412, 468, 328, 236, 389, 428, 370/411, 419, 252, 254, 241, 24.1; 455/561, 455/550.1
See application file for complete search history.

(56) References Cited

U.S. PATENT DOCUMENTS

| 7,170,903 | B2 * | 1/2007 | Alasti et al. | 370/414 |
| 7,382,744 | B2 * | 6/2008 | Bhushan et al. | 370/328 |
| 7,453,804 | B1 * | 11/2008 | Feroz et al. | 370/230 |

* cited by examiner

Primary Examiner—Chi H Pham
Assistant Examiner—Alexander Boakye
(74) Attorney, Agent, or Firm—Lee & Hayes, PLLC

(57) ABSTRACT

Each node or link of an ad hoc network assists in the distributed allocation of a data channel to increase fairness, even in a multi-hop network, by tracking a measure of link weight for itself and sharing this information over a control channel with neighboring nodes. The metric can be provided over a dedicated control channel, added as a header to data communication on a data channel, or inferred by monitoring data traffic from the neighboring node. The link weight can be adjusted by a link quality factor based on provided or inferred metrics such as transmission rates, ratio of transmission errors, idle time, etc. For multiple flow queues at a subject node, one with a higher transmission rate can be selected for increased fairness. When a packet is received, medium access includes allocating bandwidth, including bonding multiple frequencies that are determined to be available to both nodes.

23 Claims, 7 Drawing Sheets

SPECTRUM AND MEDIUM ACCESS ALLOCATION FOR FAIRNESS

BACKGROUND

Wireless communication technology has gained widespread acceptance in recent years. A wireless local access network (WLAN) is a data transmission system to provide location independent network access between computing devices by using radio waves rather than a cable infrastructure. Often, WLANs are implemented as the final link between existing wired network and a group of client computers, giving these users wireless access to the full resources and services of the corporate network across a building or campus setting.

Wireless local area networks have come into greater use, with the advent of the IEEE 802.11 standard. The rate at which wireless networks are being deployed is accelerating along with their size and ubiquity. Wireless networks using access points based on IEEE standard 802.11, commonly referred erroneously to as WiFi comprise a majority of current wireless deployments. The 802.11 standards were implemented to provide reliable and secure wireless connectivity at high data rates. Like all of the IEEE 802 standards, 802.11 standards focus on the bottom two level of the International Organization for Standardization (ISO) model, the physical layer and the data link layer. The data link layer provides and functional and procedural means to transfer data between network entities and to detect and possibly correct errors that may occur in the physical layer. In the current context, this data link layer is further subdivided into Media Access Control (MAC) sublayer that manages interaction of devices with a shared medium. Above the MAC sublayer is the media-independent IEEE 802.2 Logical Link Control (LLC) sublayer that deals with addressing and multiplexing on multi-access media.

Wireless transmissions by hosts within proximity of each other can interfere. Therefore, several medium access control (MAC) protocols for wireless networks have been proposed in the past. In general, MAC protocols may be divided into two types: In centralized protocols, a designated host (often referred to as base station or access point) coordinates access to the wireless medium. A node wanting to transmit must wait until permission to transmit is granted by the coordinator node. The mechanisms for requesting and granting such permission may differ in different protocols. Point Coordination Function (PCF) in IEEE 802.11 is an example of the centralized approach.

In distributed protocols, a coordinator is not needed to arbitrate access to the wireless medium. For instance, in the CSMA (carrier sense multiple access) protocol, a node wishing to transmit a packet does so only if it does not hear another on-going transmission. CSMA protocol is fully distributed, since each node independently determines whether to transmit a packet or not. Distributed Coordination Function (DCF) in IEEE 802.11 is an example of the distributed approach.

There are several benefits of using a distributed approach as compared to a centralized approach: In the centralized approach, if a node cannot communicate with the coordinator, then it cannot transmit any packets. On the other hand, with a distributed protocol, if a node cannot communicate with some nodes, it may still be able transmit packets to other nodes. In the centralized approach, the coordinator has the responsibility of keeping track of the state information for nodes on the LAN. In distributed protocols, this overhead can be eliminated. In a centralized approach, it is difficult to use a battery-powered node as the coordinator, since the coordinator will fail if the battery runs out. With failure-prone coordinators, other nodes must be able to reliably detect failure of the coordinator, and elect a new coordinator.

Challenges exist, however, in implementing a distributed allocation of bandwidth in an ad hoc network not having the benefit of a coordinator. Most of the MAC schemes do not result in optimum transmission pattern, which should provide maximum network utilization, when used in multi-hop networks. In order to provide an optimum transmission pattern or structure, the schedule or queue of all active nodes in the entire network should be known. Given the dynamic and distributed nature of ad hoc networks, the information of the entire network is usually unknown before decisions can be made to start accessing the channel.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

In accordance with one or more versions and corresponding disclosure thereof, various aspects are described in connection with a method and apparatus for distributed bandwidth allocation among a plurality of wirelessly communicating nodes of an ad hoc network. At least one flow queue is maintained at a subject node. A metric is obtained representing a flow queue maintained by a neighboring node. A link weight is determined for the maintained flow queue. A second link weight is assigned to the flow queue of the neighboring node and communicated to the subject node. Bandwidth is then allocated of the data channel to send a packet from the maintained flow queue based upon the relative difference in the first and second link weights.

In a wireless mesh network, link load is unevenly distributed, and it depends on the traffic matrix and routing decisions. Rather than relying solely on medium access control as is conventional for mesh architectures, cognitive radio capability is taken advantage of in adding a dimension which is a frequency allocation. A cognitive radio can bond several channels together to increase the capacity of a transmission. This bonding scheme improves fairness. It will allocate a larger bandwidth, such as by bonding several channels together, to a node that transports more traffic.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

DETAILED DESCRIPTION

Figure 1:
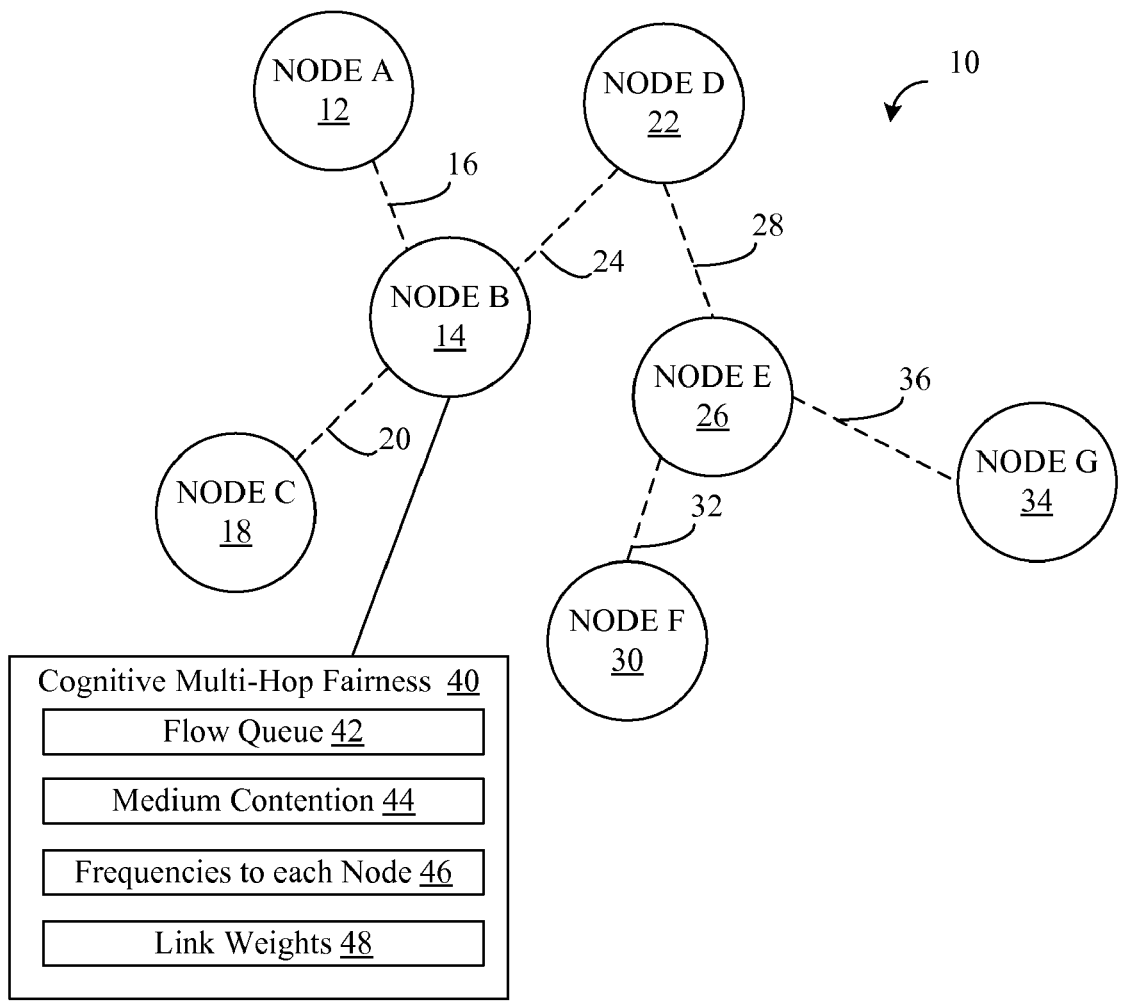
FIG. 1 illustrates a multi-hop ad hoc network having nodes that perform bandwidth allocation of a multi-frequency data channel in a distributed manner with reference to a dedicated control channel.

Each node or link of an ad hoc network assists in the distributed allocation of a data channel to increase fairness, even in a multi-hop network, by tracking a measure of link weight for itself and sharing this information over a control channel with neighboring nodes. The metric can be provided over a dedicated control channel, added as a header to data communication on a data channel, or inferred by monitoring data traffic from the neighboring node. The link weight can be adjusted by a link quality factor based on provided or inferred metrics such as transmission rates, ratio of transmission errors, idle time, etc. For multiple flow queues at a subject node, one with a higher transmission rate can be selected for increased fairness. When a packet is received, medium access includes allocating bandwidth, including bonding multiple frequencies that are determined to be available to both nodes.

Various versions are now described with reference to the drawings. In the following description, for purposes of explanation, numerous specific details are set forth in order to provide a thorough understanding of one or more aspects. It may be evident, however, that the various versions may be practiced without these specific details. In other instances, well-known structures and devices are shown in block diagram form in order to facilitate describing these versions.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed versions. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed versions.

Various versions will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various versions disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, a multi-hop ad hoc network 10 includes seven nodes that can only communicate with one, two or three neighboring nodes. For clarity, each link depicted is symmetrically two-way. In particular, a Node "A" 12 forms a link with Node "B" 14 as depicted 16. Node "B" forms a link with a Node "C" 18 a depicted at 20 and forms a link with a Node "D" 22 as depicted at 24. Node "D" further forms a link with a Node "E" 26 as depicted at 28. The Node "E" 26 further forms a link with Node "F" 30 as depicted at 32 and forms a link with Node "G" 34 as depicted at 36. It should be appreciated that aspects have application as well to single hop ad hoc networks and that this arrangement is illustrative only.

Node "B" 14 includes a cognitive multi-hop fairness component 40 that maintains a flow queue 42 of packets that are to be sent. A medium contention component 44 gains access to link 16, 20, 24 to transmit the packets. The transmission is advantageously made with awareness of frequencies that are available to both nodes that form the link, as depicted by a data structure at 46. Bandwidth is allocated over a proportion of these available frequencies based upon link weight data 48 for the subject node 14 as well as the neighboring nodes 12, 18, 22. It should be appreciated that other nodes in FIG. 1 can also include the features depicted for Node "B" 14.

Figure 2:
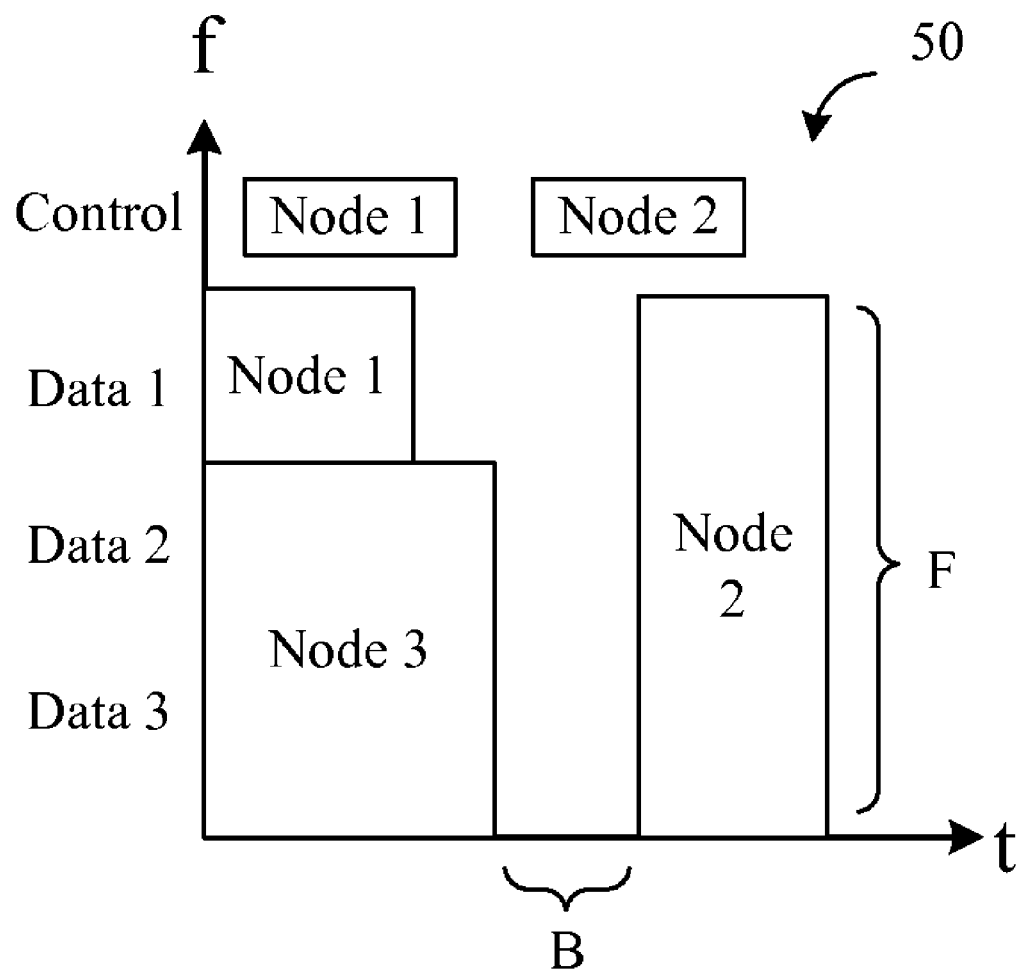
FIG. 2 is an illustrative plot of the data channel and multi-frequency data channel being used by three nodes of the ad hoc network of FIG. 1.

In particular, in FIG. 2, a depiction of a network frequency versus time allocation of bandwidth 50 includes a dedicated control channel ("control") that serves for signaling between nodes, depicted as Nodes "1", "2" and "3". Such signaling of status may be initiated in response to a query from a neighboring node or be periodically broadcast for the benefit of nodes that are within reception range. Use of a plurality of data channels, illustrated as Data "1", "2", and "3", is contended for, as depicted by a Node "1" packet on Data "1" and Node "3" on Data "2" and "3" initially. After a back-off time of "B" once Node "2" sees that the data channel is open, Node "2" takes a larger frequency band of Data channels "1", "2" and "3" to form a channel of "F" bandwidth. It should be appreciated that control of the channel also is a varied in duration as well as frequency in accordance with a link weight of Node "2" relative to the Nodes "1" and "3".

It should be appreciated with the benefit of the present disclosure that use of control channel is illustrative and that information about neighboring nodes can be determined by data sent via a data channel intended for consumption by another node for purposes of sharing flow rate or similar metric information. Alternatively, metric data can be embedded in a header of data communication. As yet another alternative, a subject node can monitor the data traffic from other nodes in an ad hoc network to calculate or approximate the metrics for neighboring nodes, such as by sensing idle times. The metrics tracked or disseminated can include size of queues for one or more flow queues handled by the particular node, transmission rates per flow queue/node, and/or transmission time between nodes.

Figure 3:
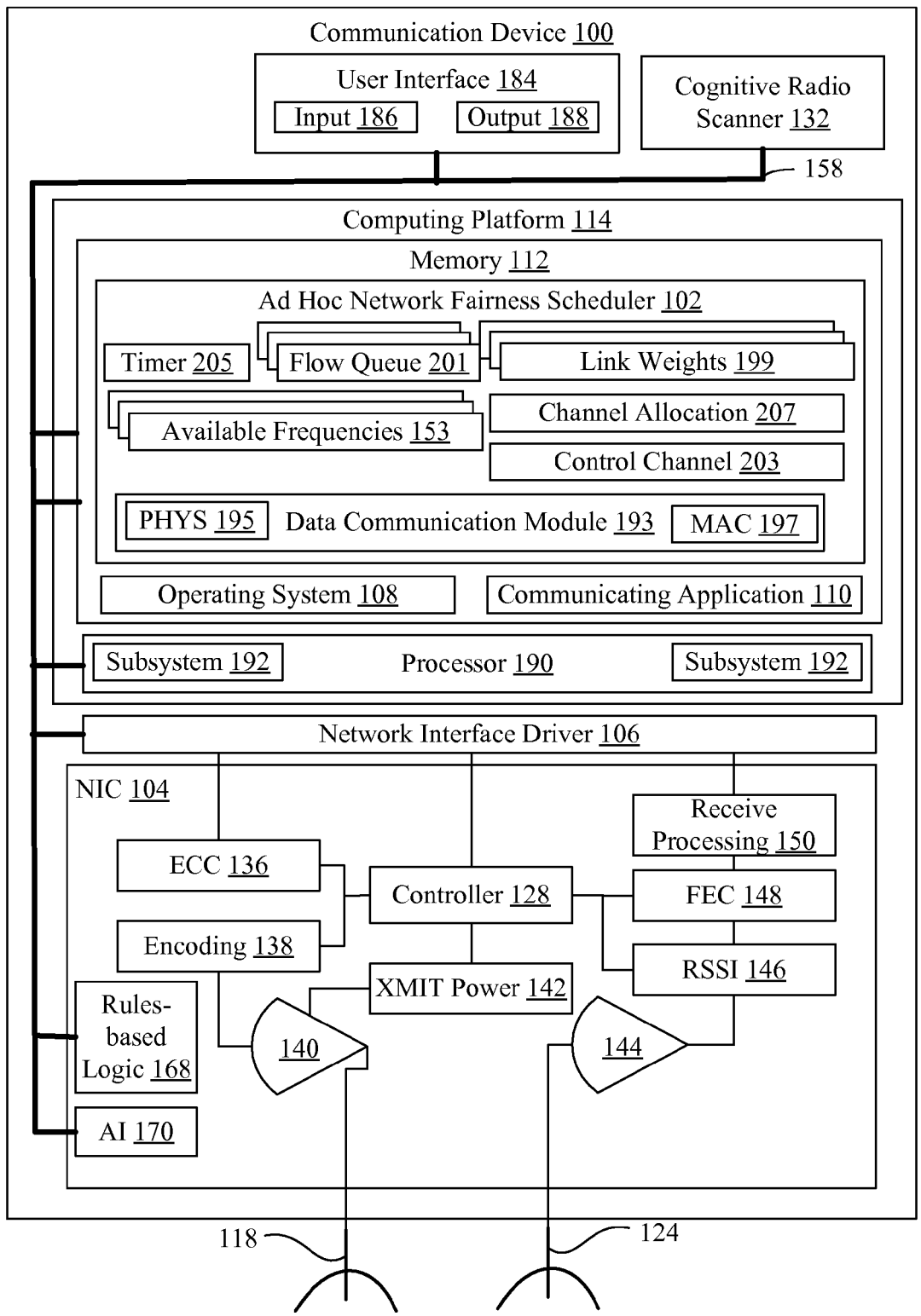
FIG. 3 is a schematic diagram of an exemplary node of the ad hoc network of FIG. 1.

In FIG. 3, there is illustrated a schematic block diagram of a communication device 100 according to one aspect of the subject invention, in which an ad hoc network fairness scheduler 102 increases the fair use of a wireless data channel by previously coordinating with other communication devices as to link weights and available frequencies and then allocating bandwidth in frequency and duration in accordance with these link weights. The nodes 12, 14, 18, 22, 26, 30, 34 of FIG. 1, as well as any other computing devices capable of establishing control and data wireless communication channels according to aspects of the invention may include components as illustrated in FIG. 3. Thus, the communication device 100 can include a network interface card (NIC) 104 which allows the communication device 100 to communicate over a network such as, for example, the wireless ad hoc network 10 (FIG. 1). A network interface driver 106 enables interaction between NIC 104 and other components of the communication device 100, such as, for example, an operating system 108 and a communicating application 110, both resident in a memory 112 of a computing platform 114 of the communication device 100 along with the fairness scheduler 102. Driver 106 may be computer-executable instructions encoded in a suitable computer-readable medium, which may include memory components on NIC 104 or may include memory storing operating system instructions for device 100 or other suitable memory depicted at 112.

NIC 104 can provide functionality of a receiver and transmitter configured to receive and transmit wireless communications respectively over a transmit antenna 118 and a receive antenna 124. Components included in the receiver and transmitter are controlled by a transceiver controller 128. It should be appreciated that certain components may be externally provided over a data port (not shown)). The port can include at least one of Universal Serial Bus (USB) and/or IEEE 1394 serial communications capabilities. Other technologies that can also be employed are, but are not limited to, for example, infrared communication utilizing an infrared data port, Bluetooth™, Wi-Fi, Wi-Max, etc.

Controller 128 can receive commands from driver 106. In some versions, commands for controller 128 may be generated within components of operating system 108, application 110, or applications within the fairness scheduler 102. For instance, a cognitive radio scanner 132 can access components of the receiver through driver 106 to controller 128 in order to determine available frequencies. Similarly, status information concerning the operation of NIC 104 can be collected within controller 128 and passed to driver 106 or passed through driver 106 to operating system 108 or applications 110, 132. Accordingly, control functions for any of the components within NIC 104 can be implemented within controller 128 or may be implemented within driver 106, within components of operating system 108, or within applications 110, 132. Accordingly, the aspects of the invention relating to control of components of NIC 104 may be implemented by configuration of controller 128, programming within driver 106 or software components within operating system 108 or applications 110, 132. However, the specific mechanism by which control functions are implemented can be made by any suitable implementation.

To send packets from the communication device 100, the packets can be encoded using an Error Control Coding (ECC) component 136 providing error control coding of any suitable type. For example, the encoding may use a multi-bit error correcting code. In the version illustrated, ECC component 136 can add a number of error control bits to each packet to be transmitted. The number of error control bits added to a packet may be configurable in response to commands from controller 128. Altering the number of bits per packet used for error control coding is a possible adaptation that may be made in NIC 104 for poor channel conditions. For example, more error control bits can be added in a noisy channel in which frequent errors occur. However, increasing the number of bits used for error correction reduces the percentage of bits used for data transmission.

An encoding component 138 may implement any suitable encoding according to a data transmission protocol used for wireless communication. Encoding implemented within encoding component 138 may use a modulation scheme that is configurable based on input from controller 128. The modulation scheme used in encoding component 138 may also be used to adapt to channel conditions. For example, encoding component 138 may support a range of encoding schemes with a variable number of bits per symbol. To adapt to noisy channels, encoding component 138 may be controlled to use an encoding scheme with a high number of bits per symbol. Conversely, in a high-quality channel, encoding component 112 may be controlled to use an encoding scheme with a low number of bits per symbol, thereby increasing the data transmission rate.

The encoded data are then transmitted by a transmitter 140 at a transmit power level controlled by a transmit "Xmit" power controller 142. Transmission may be made via the transmit antennae 118. The transmit power level may also be controlled by controller 128 and may serve as a further mechanism to adapt to channel conditions. For example, in a noisy channel, a higher transmit power may be specified.

Corresponding processing may be performed on received packets. Packets received by the communication device 100 at the receive antennae 124 may be processed through a receiver 144 and then supplied to a received signal strength indicator (RSSI) component 146. RSSI may be obtained from a field in a received packet or it may be directly measured from the received wireless signal and then output in any suitable format. RSSI component 146 may output a signal strength or a signal to noise ratio (SNR) for any desired packets. In the version illustrated, RSSI component 146 outputs a signal strength indication based on the received signal strength. However, the signal strength indication may be obtained in any suitable way. For example, it can be a field in a packet (e.g., an ACK packet) that contains an SNR value from a corresponding packet measured at the receiver side (e.g., a DATA packet).

The NIC 104 may include one or more components that decodes a received signal to produce a set of digital values for processing. The received bits may be modified in a forward-error correction (FEC) component 148 implementing forward-error decoding. In the version illustrated, FEC component 148 performs an operation that is the inverse of that performed by ECC component 136. FEC component 148 analyzes the received bits, including the error correction bits, and determines the number of bits in error in each received packet. Using an error correction algorithm, FEC component 148 determines the correct values for each bit that is incorrect and removes the error correction bits. In the version illustrated, FEC component 148 is coupled to controller 128. Accordingly, controller 128 has access to information concerning the number of errors detected in each received packet. It should also be appreciated that other types of error correction coding and decoding may be utilized by the communication device 100.

The FEC component 148 is coupled to a received data processing component 150 which further processes the received packets. Received processing component 150 may perform any number of received processing operations. For example, received processing component 150 may include a buffer in which a received packet is stored until it is transferred for further processing within operating system 108.

In the version illustrated, network interface card 104 may be implemented using technology as is known for constructing wireless network interface cards, including implementation of known antennae technology. Likewise, the error correcting coding implemented by ECC component 136 and FEC component 148 may be performed according to a known error correction algorithm. Likewise, the encoding performed in encoding component 138 may be performed in accordance with an 802.11 standard or in any other suitable way. The transmit power may be controlled by transmit power component 142 also using conventional components. Also, the received signal strength may be measured in RSSI component 146 in a conventional way, and receive processing component 150 may be implemented using conventional components. Controller 128 may also be implemented using conventional technology. For example, all of the components within NIC 104 may be implemented in a single integrated circuit chip or in multiple integrated circuit chips using technology currently known for constructing network interface cards.

It should be appreciated with the benefit of the present disclosure that the controller 128 performs cognitive radio functions in a noninterferring manner with the transmit and receive functions of the NIC 104. The scanner 132 detects and characterizes (e.g., pattern matching, bandwidth, power of frequency spectra, duration) in order to detect network devices and interference emitters. This information can be advantageously tagged with time and location data for historical reference and/or persistent interference adaptation. The available frequencies are stored in a data record 153 for broadcasting to neighboring nodes and for selecting frequencies for use. The memory 112 and other portions of the computing platform 114 communicate across a databus 158, such as a rules-based logic component 168 and an artificial intelligence (AI) component 170.

The AI component 170 can facilitate automating performance of one or more features described herein such as predicting link weights or adaptations for interference emitters such as during a situation in which information for neighboring nodes has become stale. Thus, employing various AI-based schemes can assist in carrying out various aspects thereof. For example, a process for determining a frequency and duration allocation be facilitated via an automatic classifier system and process.

A classifier is a function that maps an input attribute vector, $x=(x1, x2, x3, x4, xn)$, to a class label class(x). A classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria, a present and/or target location, location-based data and/or services, when/if to communicate data location-based services, preferences for types of data to exchange, etc.

The rules-based logic component 168 can also be employed to automate certain functions described or suggested herein. In accordance with this alternate aspect, an implementation scheme (e.g., rule) can be applied to define thresholds, initiate location detection, facilitate communication of location-based services, preferences for types of data to exchange, etc. By way of example, it will be appreciated that the rule-based implementation can automatically define criteria thresholds whereby an analyzer component or processor 190 can employ the thresholds to allocate bandwidth and/or set of data for adaptation (e.g., diversity configuration). In response thereto, the rule-based implementation can affect determination of wireless network bandwidth allocation and/or services by employing a predefined and/or programmed rule(s) based upon any desired criteria (e.g., inferred knowledge about changes to links of an ad hoc network).

According to some aspects, the communication device 100 may comprise any type of computerized, communication device. For example, the communication device 100 may comprise a mobile communication device, such as a wireless and/or cellular telephone. Alternatively, the communication device 100 may comprises a fixed communication device, such as a Proxy Call/Session Control Function (P-CSCF) server, a network device, a server, a computer workstation, etc. It should be understood that communication device 100 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 100 can be a remote-slave or other similar device, such as remote sensors, remote servers, diagnostic tools, data relays, and the like, which does not have an end-user thereof, but which simply communicates data across a wireless or wired network. In alternate aspects, the communication device 100 may be a wired communication device, such as a landline telephone, personal computer, set-top box or the like. Additionally, it should be noted that any combination of any number of communication devices 100 of a single type or a plurality of the afore-mentioned types may be utilized in the cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 100 may include a user interface 184 for purposes such as requesting, interacting with, and/or playing media content. This user interface 184 includes an input device 186 operable to generate or receive a user input into the communication device 100, and an output device 188 operable to generate and/or present information for consumption by the user of the communication device 100. For example, input device 186 may include at least one device such as a keypad and/or keyboard, a mouse, a touch-screen display, a microphone in association with a voice recognition module, etc. In certain aspects, input device 186 may provide for user input of a request for content or for user input of a request for additional information. Further, for example, output device 188 may include a display, an audio speaker, a haptic feedback mechanism, etc. Output device 188 may generate a graphical user interface, a sound, a feeling such as a vibration, etc., and such outputs may be associated, for example, with the presentation of media content.

The computer platform 114 of the communication device is operable to execute applications to provide functionality to the device 100, and which may further interact with input device 186 and output device 188. The memory 112 of the computer platform 114 may include volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 112 may include active memory and storage memory, including an electronic file system and any secondary and/or tertiary storage device, such as magnetic media, optical media, tape, soft and/or hard disk, and removable memory components. In the illustrative version, memory 112 is depicted as RAM memory with storage device 180 representing nonvolatile local storage, which can be removeable, each connected to the data bus 158 of the computer platform 114. Certain of the capabilities of the communication device 100 can be facilitated by code loaded from local storage (not shown), retained in memory 112, and executed by a processor 190, such as the operating system (OS) 108.

Further, computer platform 114 may also include the processor 190, which may be an application-specific integrated circuit (ASIC), or other chipset, processor, logic circuit, or other data processing device. In some aspects, such as when communication device 100 comprises a cellular telephone, processor or other logic such as an application specific integration circuit (ASIC) (not shown) may execute an application programming interface (API) layers (not shown) that interfaces with any resident software components, such as voice call, data call, and media-related applications in memory 112. Device APIs may be a runtime environment executing on the respective communication device 100.

Additionally, processor 190 may include various processing subsystems 192 embodied in hardware, firmware, software, and combinations thereof, that enable the functionality of communication device 100 and the operability of the communication device 100 on a communications system (not shown). For example, processing subsystems 192 allow for initiating and maintaining communications, and exchanging data, with other networked devices as well as within and/or among components of communication device 100. In one aspect, such as in a cellular telephone, processor 190 may include one or a combination of processing subsystems 192, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 192 of processor 190 may include any subsystem components that interact with applications executing on computer platform 114.

Computer platform 114 may further include a communications module 193 with functionality in addition to, or as an alternative to, the NIC 104, that enables communications among the various components of communication device 100, as well as being operable to exchange control and data communication between the communication device 100 and the ad hoc network 10 (FIG. 1), such as by accessing a PHYS component 195 and a MAC component 197. Such a communications module 193 can be embodied in hardware, firmware, software and/or combinations thereof, and may further include all protocols for use in intra-device and inter-device communications.

It should be appreciated that the communication device 100 includes provisions for power supply. Power can be provided to the processor 190 and other components forming the communication device 100 by an onboard power system (e.g., a battery pack or fuel cell). In the event that the power system fails or becomes disconnected from the device 100, a supplemental power source can be employed to provide power to the processor 190 (and other components and to charge the onboard power system, if a chargeable technology. For example, the alternative power source can facilitate an interface to an external grid connection via a power converter. The processor 190 of the device 100 can induce a sleep mode to reduce the current draw upon detection of an anticipated power failure. For example, the wireless control component 102 can advantageously detect a situation in which no control channel is available, or a negotiated data session is still some time away, and turn of portions of the communication device 100 in order to conserve stored power and/or to reduce thermal loads.

Each link (e.g., communication device 100) in an ad hoc network enhances fairness in bandwidth allocation, even in a multi-hop network, by maintaining link weights based upon traffic information (e.g., number of packets queued per each flow, the total number of queued packets, the total number of queued flows, or a combination of the above, etc.) for neighboring nodes in link weights database 199. The device 100 also maintains one or more flow queues 201 for packets to be sent and calculates a link weight for itself that is communicated to other devices 100 via a control channel 203. When a link (i.e., device 100) has a packet to transmit, it will do so by contending for a medium access of the data channel. One of the parameters of the contention mechanism is the link weight, with higher link weights increasing the chances of a node to access the channel. Once a node (i.e., device 100) has gained the access to the channel, it senses the available frequencies via the cognitive radio scanner 132. Then, it will select a subset of these frequencies as a function of the link weight (i.e., the higher the weight, the more frequencies are selected) and bond them together. In an illustrative implementation of channel contention and frequency bonding mechanisms, based on 802.11 MAC. Each node 100 disposes of a back-off counter 205. The counter 205 is decremented whenever a node 100 senses the medium idle. When the counter 205 drops to zero (0), a node 100 transmits a packet. Let $w_i$ be the weight of node i. In this particular example we will assume it equals to the total number of packets in i's queue. In general, it may be any function of the number of queued packets for each flow.

If the node's transmission was successful, the node i will set its back-off to a random value $B_i$ whose mean value is $f_i(w_i, w_{j1}, \ldots, w_{jn})$ where $w_{j1}, \ldots, w_{jn}$ are weights of neighboring nodes, learn through a signaling protocol. Typically, $f_i(w_i)$ is a decreasing function of $w_i$. If the transmission failed, the node i will set its back-off to a random value $B_i$ whose mean value is $f_i(w_i)+B'_i$ where $B'_i$ is the previous initial value of the back-off counter 205.

Each node 100 in a network 10 maintains a list of frequencies F available to him in data record 153. It also learns the frequencies available to its neighbors through some form of signaling protocol that are also stored in data record 153. When node i wants to transmit a packet to node j, it will first find the list of frequencies $F_i \cap F_j$ available to both nodes i and j.

Then, the node will randomly select N frequencies from the set of the available ones, such that the probability $P(N=n)=F_j(n, w_i, w_{j1}, \ldots, w_{jn})$ depends on the weights of link i and its neighbors. It will announce the selected frequencies to the receiver and other neighbors on the signaling channel, bond them and finally transmit a packet over a channel allocation (data channel) 207.

Figure 4:
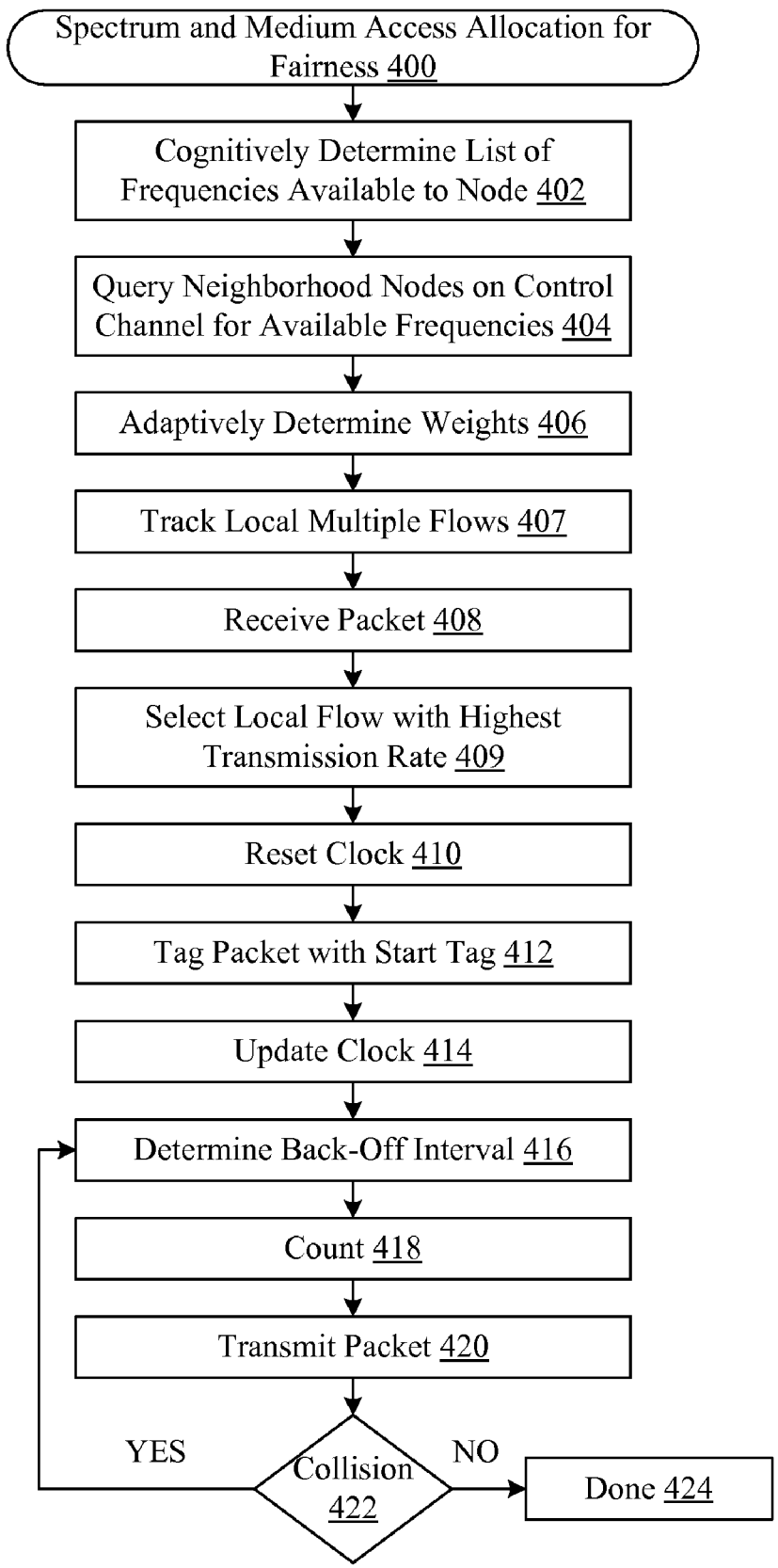
FIG. 4 is a flow diagram for a methodology for performing bandwidth allocation in a multi-hop ad hoc network.

Referring now to FIG. 4, a flow diagram of a methodology 400 according to an version of the invention is shown. The method is for allocating bandwidth among a plurality of flows sharing a wireless data channel. Each flow can correspond to a node, or a number of nodes, where in the latter instance each flow can correspond to a queue over the nodes. The output link can correspond to a network, such as a local-area network (LAN), a multi-hop network, or a wireless network. In block 402, the node cognitively determines the list of frequencies available to the node. The available frequencies may be limited by an interference emitter or by neighboring nodes assigned to use certain channels. Available frequencies could also include bands such as those reserved for television broadcasts that are cognitively determined to be unused and available for data communication. In block 404, neighboring nodes broadcast, or are queried to broadcast, frequencies that they have determined are available for their use. The available frequencies can differ depending on the particular neighborhood of a respective node. In block 406, a weight for each flow is adaptively determined based on a predetermined criterion. The weights are adaptively determined in that they can vary over time, in a dynamic manner, and are not static or fixed a priori.

In one version, the predetermined criterion is an input rate of data packets at each flow. For example, the input rate may be an input rate at which packets are arriving at or within a flow for transmission over the output link. Where each flow corresponds to a node, the packets may be generated by a different application program at the node. Where a flow corresponds to a number of nodes, the packets may be generated by different nodes.

In this version, adaptively determining a weight for each flow in block 400 includes determining the input rate for each flow, and adaptively determining the weight for each flow as the input rate multiplied by a normalizing constant. For instance, in one version, the input rate at a given time $\tau$ is $$r(\tau)=(tr(t)+\xi L)/\tau$$

where, $\xi$ is a rate-sensitivity constant, r(t) is the input rate at a previous time t, and L is the packet size. The rate-sensitivity constant determines sensitivity of the rate estimate to short-term changes in the arrival pattern. Given the input rate, the weight is $$w(\tau)=r(\tau)/\text{Normalizing factor,}$$

where Normalizing factor is a constant. For instance, in the case of a 2 Mbps (mega-bits per second) network, the maximum achievable throughput can be about 1.3 Mbps, where the packet size L is 512 bytes. Thus, a normalizing factor of 1.3 Mbps can be used. With such a normalizing factor, the weight approximately represents the arrival rate as a fraction or multiple of maximum achievable throughput.

In another version, the predetermined criterion is the queue size of each flow. For example, the queue size can correspond to the number of packets within a queue at a flow awaiting transmission by the queue for transmission over the output link. In this version, adaptively determining a weight for each flow in block 406 includes estimating the number of packets in the queue of each flow, and adaptively determining the weight for each flow as the number of packets in the queue divided by a maximum number of packets allowed in the flow.

Thus, still describing the version where the queue size for each flow is the predetermined criterion for adaptively changing the weights for the flows, the weight can be determined as $$w(\tau)=(\text{Average queue size}(\tau))/(\text{Maximum allowed queue size}),$$

Average queue size($\tau$) is the number of packets pending in the queue at time $\tau$. Maximum allowed queue size specifies the maximum allowed size of the queue for the flow.

In block 406, a portion of the bandwidth of the output link is allocated to each flow, proportional to the weight for each flow. Block 406 can be used in conjunction with protocols and algorithms used to implement fair scheduling in broadcast environments, in which such weights are typically static or fixed a priori implicitly or explicitly. For example, the weights determined in block 406 can be used to allocate bandwidth to each flow that passes through the same node as well by tracking the local multiple flows as depicted in block 407.

In block 408, a packet, for example, a packet of data, is received at the node for transmission there from, through the link or network coupling all the nodes, or from an application running on the node. In block 409, the local flow with high transmission rate is selected for transmission. In block 410, a virtual clock is reset to zero. The virtual clock is a clock maintained by each node within the network. In this version, it is reset only once each time a packet is received. The virtual clock is written as $v_i(t)$, where t is actual, physical time—for example, as maintained by a real-time clock within the node—and "i" specifies the node. Thus, the resetting of the virtual clock to zero in block 410 is written as $v_i(t)=0$.

In block 412, the packet is tagged with a start tag. The start tag is a function of the time when the packet arrives at the node. The packet itself is denoted as $P_i^k$, where P is the packet, "I" indicates the node, and k indicates the k-th packet received at the node. The tag is specified as $S_i^k$ and determined as $$S_i^k=\max\{v(A_i^k), F_i^k-1\},$$

where $A_i^k$ specifies the real time at which packet $P_i^k$ arrives at node i, and $F_i^k-1$ specifies the finish tag of the previous packet. The finish tag of a packet is determined as $$F_i^k=S_i^k+\gamma L_i^k/w_i,$$

where $L_i^k$ specifies the length of the packet and $w_i$ specifies weight of node i, higher weight is given to nodes that require a greater share of the bandwidth. γ is the scaling factor used to allow a choice of the scale for the virtual clock.

In block 414, the virtual clock is updated. It is noted that the virtual clock is updated only when a packet is transmitted from a node onto the link. Thus, if at time t, a packet is in service, then $v_i(t)$ is updated to $$v_i(t) = \max(v_i(t), s)$$

where s is the start tag of the packet in service. It is noted that the virtual clock is not updated at any other time in one version.

Once a node i desires to transmit the packet, then in block 416, it determines an appropriate back-off interval, which is generally defined as the length of time the node waits until actually transmitting the packet onto the link. This interval is denoted as $B_i$, and is based on the start tag and the current virtual time $v_i(t)$ in one version. Specifically, $$Bi = [\eta * (S_i^k - V_i(t))]$$

where η, the Backoff_Multiplier is a constant in one version.

It is noted that because of the manner in which the start tags and the virtual clock are determined, $B_i$ is non-negative. However, if the start tag and the virtual clock are identical, $B_i$ may become equal to zero. To avoid this, in one version, Bi is further modified as $$B_i = B_i + X_i$$

where X is uniformly distributed in [1, β] where β, the Backoff_Window, is a positive integer. This further reduces the probability of back-off intervals of two nodes counting down to zero at the same time, in block 416 as well the back-off counter is reset to zero after this step is performed.

The node then starts counting from the back-off interval to a predetermined transmission time, such as zero, in block 418; that is, the node does not actually send the packet until the predetermined transmission time is reached in block 418, as counted down from the back-off interval. Thus, in block 420, the node has counted down from the back-off interval to the predetermined transmission time, and therefore transmits the packet over the network or link. At this time, the node also tags the packet with a finish tag, as determined as has been described.

In block 422, it listens to determine whether another node has sent a packet at exactly the same time, such that a collision resulted. If not, then the method is done in block 424. It is noted that in this case, when another packet needs transmission via the method 400 of FIG. 4, that the virtual clock will not be reset in block 410, since it is only reset once. However, if a collision has resulted, then a new back-off interval ($B_i$) must be determined, and the packet ultimately resent. Thus, the method goes back to 416. However, in this iteration of 416, the back-off counter is increased by one, to indicate that the back-off interval ($B_i$) has already been determined once, and a new back-off interval is selected, uniformly distributed in $$[1, 2^{backoff\_counter-1} * \beta],$$

This new determination of the back-off interval is used if future iterations are necessary—that is, if any more collisions result.

It is noted that this back-off interval is small. This is done to increase the probability that a colliding node "wins" the back-off interval countdown as against the other nodes, so that a collision does not result in unduly delaying the transmission of the packet. However, to minimize the occurrence of too many collisions, the range for $B_i$ increases exponentially with the number of collisions.

It is noted that the specific determination of the back-off interval for a node is not limited to the description above. Other variations are possible, in particular, to trade off between the probability that a collision may occur, and the overhead incurred by the choice of large back-off intervals. In varying versions, two alternatives are determining the back-off interval can be used:

(1) Initially selecting a back-off interval to be linearly proportional to (start tag minus virtual time). In one version, a random component is added to this value. For example, the back-off interval is selected to be uniformly distributed within 20% of (start tag minus virtual time). Such an approach is advantageous when the likelihood of many nodes choosing the same back-off interval is large.

(2) As described in (1), once the back-off interval is chosen, it is decremented until it reaches the predetermined transmission time, in one version, zero. A new back-off interval is not selected for a packet unless a collision occurs when its back-off interval reaches the predetermined transmission time. This approach works because the back-off interval is chosen to be linearly proportional to (start tag minus virtual time). However, where there are many nodes, there can be a case where all nodes choose large back-off intervals, such that too much time is spent idling when the back-off counters are decrementing to the predetermined transmission time. Thus, another alternative is to use a non-linear function to set the back-off interval, but emulate the relative order of back-off intervals chosen in (1). For example, a function of the form $K_1 * (1 - K_2^{-(start\_tag-virtual\_time)})$ is used in one version. In this case, however, after each packet transmission, the back-off counter of each pending packet needs to be predetermined, so as to emulate the scheme in 1).

The method of FIG. 4 can be summarized as follows. Each node of the network may have a pending packet to be transmitted over the network. For each node that does, when the packet actually arrived at the node—for example, when the packet was generated within the node, and then "arrived" at the node for transmission by a medium access controller (MAC) of the node—the packet is stamped with a start tag, and a back-off interval is determined for the node. The nodes thus start counting down from their respective back-off intervals to zero, in one version. The first node that "wins"—the first node that counts down to zero—sends its packet. This node then is able to receive another packet, and the process starts over for that node. Thus, as nodes count down to zero, they fire off their packets. The method also takes care of the situation where more than one node count down to zero at the same time, which results in a collision.

Figure 5:
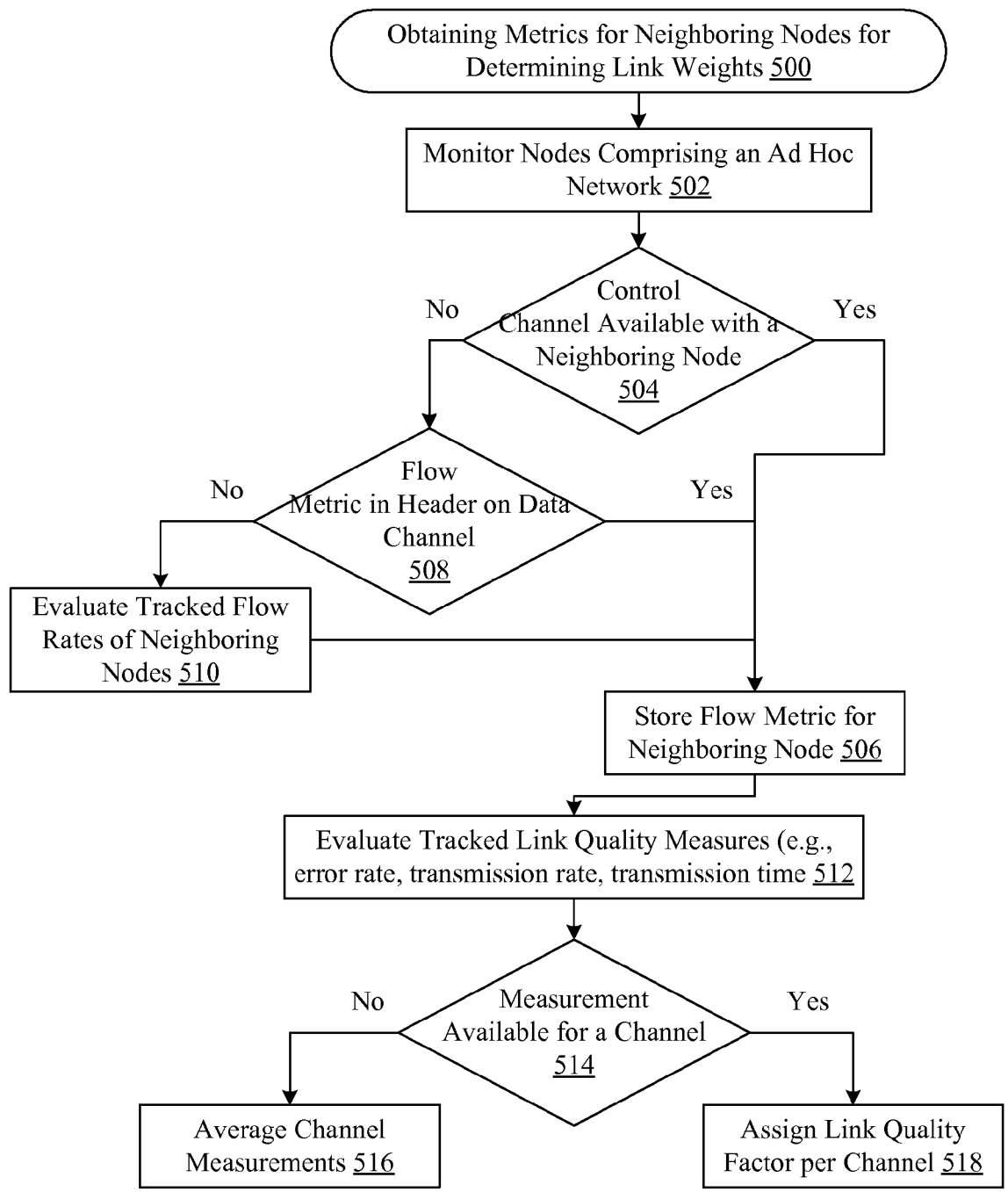
FIG. 5 depicts a flow diagram for a methodology for determining flow rates of neighboring nodes and link quality for link weights.

In FIG. 5, a methodology 500 provides for obtaining metrics for neighboring nodes for determining link weights begins in block 502 by an ongoing process of monitoring nodes that comprise an ad hoc network. Those nodes that can be directly or indirectly sensed tend to change with time due to mobility, reception, or being activated for use. Moreover, the amount of communication changes with time even for nodes that continue to sensed. The methodology 500 addresses three illustrative ways for obtaining metrics for neighboring nodes, which can be occurring simultaneously given that a mix of nodes may comport to different standards and capabilities. In block 504, a determination is made as to whether a control channel is available with a neighboring node. If so, the flow metrics can be advantageously provided without tracking or computational burdens nor without burdening the data channels. The flow metrics for determining the link weight for the neighboring node are received and stored, as depicted in block 506.

If in block 504 the control channel was not available, then in block 508 a further determination is made as to whether the neighboring node is encoding the flow metrics in a message in the data channel. For example, the metric data can be embedded in a header of other data transmissions. While placing a certain transmission overhead on the data channel, this overhead is offset by increased fairness and the computational burden on other nodes to infer the situation of this node. Thus, if present, the flow metric data is stored in block 506. If not provided by the neighboring node in block 508, then the subject nodes evaluates tracked flow rates of the neighboring node in block 510 to infer a flow metric and stores the value in block 506. The link weight can be based solely on this information.

In the illustrative aspect, the metrics obtained also support adjusting link weights to recognize quality measurements rather than being based solely on the difference in flow queues between two nodes to recognize a quality measurement. For clarity, these additional metrics are assumed to be included with the flow metrics discussed above. However, some metrics could be provided by neighboring nodes either via the control channel or the data channel whereas others may have to be inferred. For instance, a subject node could track the number of transmission failures and resends in order to infer a rate of transmission failure. For example, consider that a link weight "w" for a link "l" is based on a queue size difference between a source node "src" and a destination node "dst":

$$w(l)=(q(src(l))-q(dst(l)))*R(l) \text{ where } (q(src(l))-q(dst(l))),$$

adjusting the link weight for link "l" by a link quality measurement "R" can provide a more optimized solution in some scenarios. The link quality measurement can be based solely or in combination upon measurements such as transmission rate, fraction of loss packets, expected transmission time, etc. The link quality measurement can be determined by channel or averaged over all channels.

The utility of a link quality measurement can be illustrated. Consider an example with one link connecting very distant nodes, and one link connecting nearby nodes. The link connecting the very distant nodes will have low throughput, even if you assign all available channels to it. Due to its low throughput, the queue at the source will build up, and its weight will be very high. The second link will be unjustly starved. Multiplying the difference in the queue lengths with a link quality (i.e., the shorter link has much better quality) may remedy the situation.

Thus, in block 512, an evaluation is done on the tracked link quality measures (e.g., error rate, transmission rate, transmission time, etc.) that are provided by or inferred from neighboring nodes. A determination is made in block 514 as to whether the information is available for a particular channel. If not, in block 516, the link quality factor is based on averaged channel measurements. If so, in block 518 a link quality factor is assigned per channel. Alternatively, the determination can be made to average in all instances, even when data is available for each channel, such as to address changes in the ad hoc network with new channels becoming available.

Figure 6:
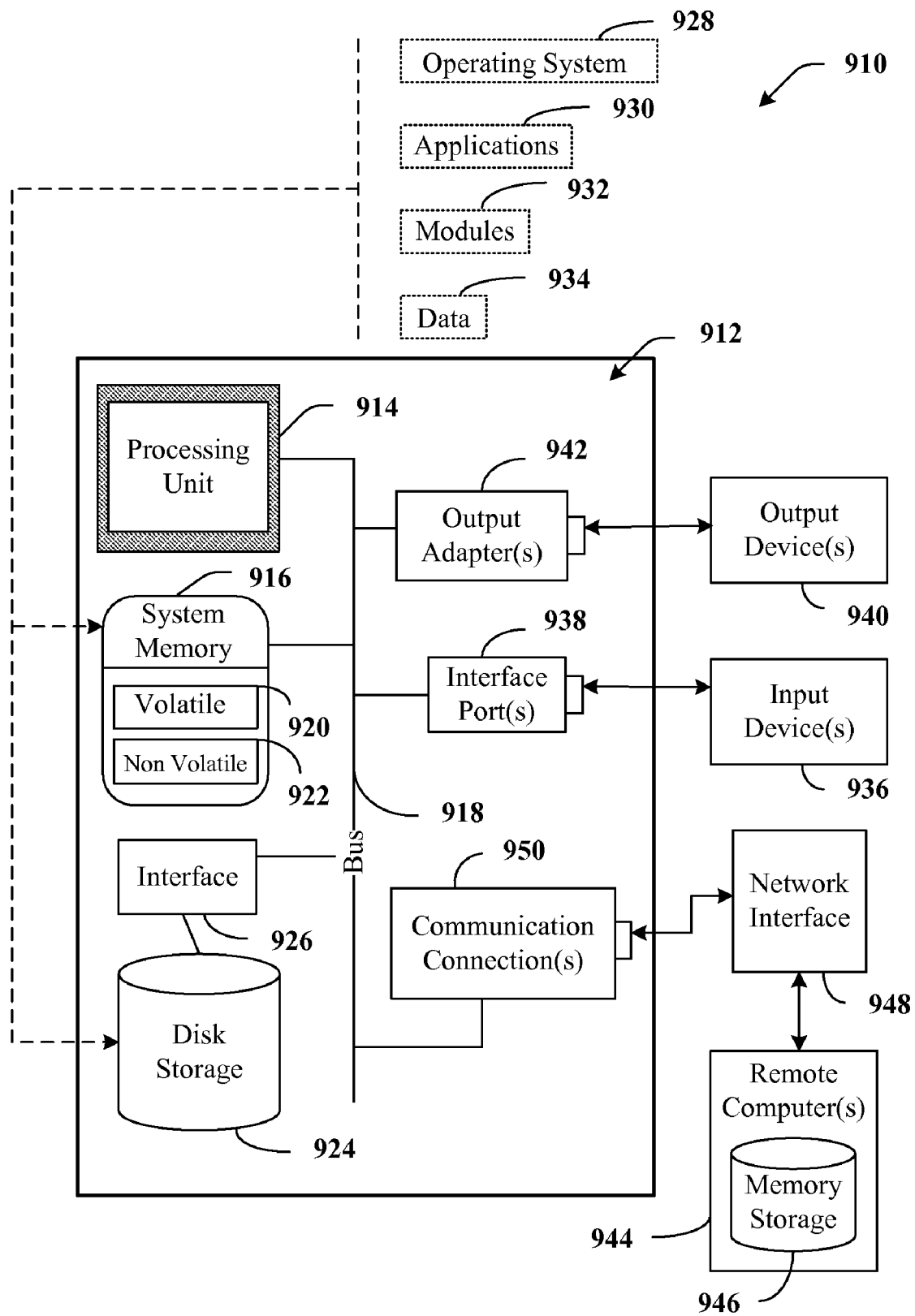
FIG. 6 depicts a schematic block diagram illustrating a suitable operating environment in accordance with an aspect of the subject invention.
Figure 7:
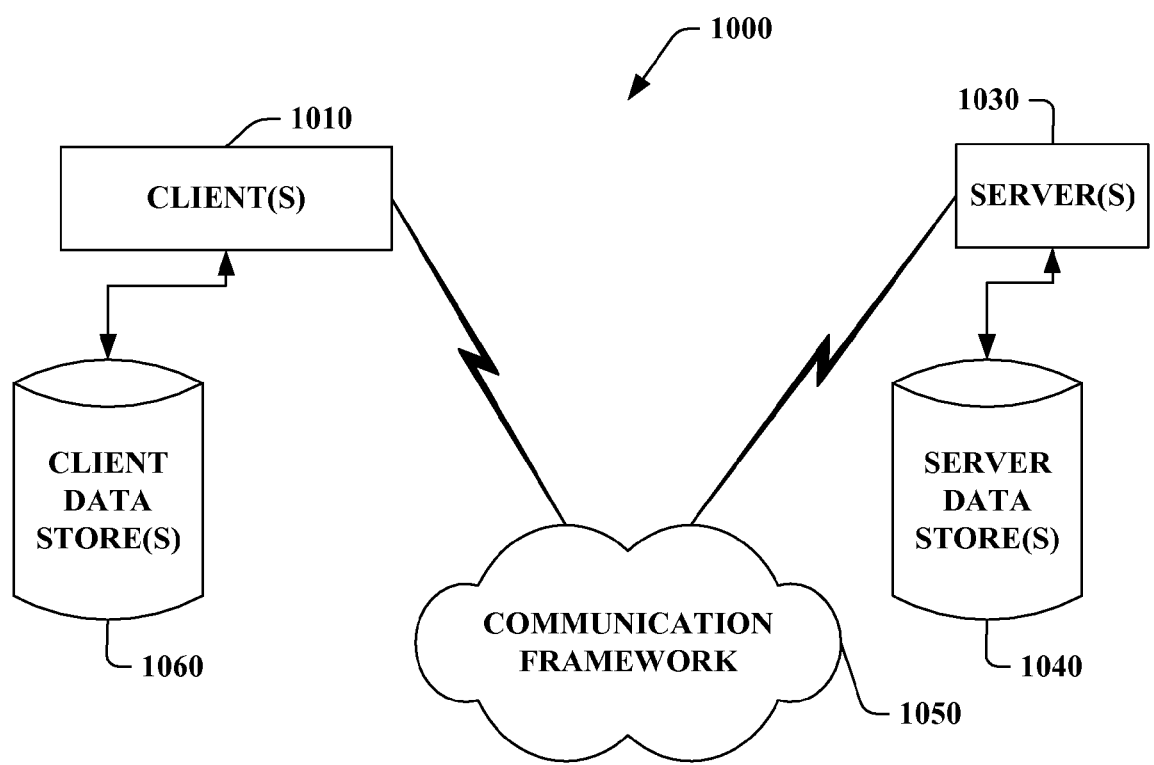
FIG. 7 depicts a schematic block diagram of a sample-computing environment with which the subject invention can interact.

With reference to FIG. 6, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 6 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 6 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 6 is a schematic block diagram of a sample computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A computer-implemented method for distributed bandwidth allocation among a plurality of wirelessly communicating nodes of an ad hoc network, comprising:
   maintaining a flow queue at a subject node;
   obtaining a metric representing a flow queue maintained by a neighboring node for transmitting via a data channel;
   assigning a first link weight to the maintained flow queue and assigning a second link weight to the flow queue of the neighboring node; and
   allocating a bandwidth of the data channel to send a packet from the maintained flow queue based upon the relative difference in the first and second link weights adjusted by a link quality factor.

2. The computer-implemented method of claim 1, further comprising obtaining the metric representing the flow queue maintained by the neighboring node by receiving the metric from the neighboring node via a control channel.

3. The computer-implemented method of claim 1, further comprising obtaining the metric representing the flow queue maintained by the neighboring node by receiving the metric from the neighboring node via a header of a data communication over the data channel.

4. The computer-implemented method of claim 1, further comprising obtaining the metric representing the flow queue maintained by the neighboring node by monitoring and evaluating data transmissions of the neighboring node over the data channel.

5. The computer-implemented method of claim 1, further comprising:
   maintaining a first flow queue at the subject node having a first transmission rate;
   maintaining a second flow queue at the subject node having a second transmission rate; and
   selecting the flow queue to send based on determining the flow queue with a higher transmission rate.

6. The computer-implemented method of claim 1, further comprising:
   determining a first plurality of data channel frequencies available to the subject node;
   ascertaining a second plurality of data channel frequencies available to the neighboring node; and
   allocating the bandwidth of the data channel as a subset of an intersection of the first and second pluralities of data channel frequencies.

7. The computer-implemented method of claim 6, wherein allocating the bandwidth further comprises binding two noncontiguous frequency bands to form the bandwidth.

8. The computer-implemented method of claim 1, wherein assigning the first and second link weights further comprises at each node:
adaptively determining a weight for locally maintained flow based on a predetermined criterion comprising an input rate for each flow, wherein the input rate r at a given time $\tau$ is derived as $r(\tau)=(tr(t)+\xi L)/\tau$ where $\xi$ is a rate-sensitivity constant, and r(t) is the input rate at a previous time t, and L is packet size; and
allocating a portion of bandwidth to the maintained flow based on relative difference between link weights for the locally maintained flow and a neighboring flow.

9. The computer-implemented method of claim 1, further comprising:
receiving a packet at a node;
assigning a start tag to the received packet, the start tag based, at least in part, on a maximum of a time measured by a virtual clock when the packet was received and a finish tag of a previously received packet, wherein the finish tag is based, at least in part, on a start tag of the previously received packet; and
transmitting the received packet at a time based, at least in part, on the assigned start tag, wherein transmitting the received packet comprises: attempting to transmit the received packet; assigning a back-off interval based, at least in part, on the assigned start tag minus a time measured by the virtual clock at a time when an attempt is made to transmit the received packet; and transmitting the received packet after the back-off interval has expired.

10. The computer-implemented method of claim 1, wherein the bandwidth is allocated in duration and frequency is based in part upon the difference in link weights between the subject node and neighboring node.

11. The computer-implemented method of claim 10, wherein the bandwidth is allocated in duration and frequency is based upon the difference in link weights between the subject node and neighboring node as adjusted by a link quality factor.

12. A device for distributing bandwidth allocation among a plurality of wirelessly communicating nodes of an ad hoc network, comprising:
a wireless data transceiver for communicating on a data channel, wherein the wireless transceiver communicates over a control channel and a data channel, the controller allocates bandwidth based upon the relative difference in first and second link weights adjusted by a link quality factor; and
a controller that maintains a flow queue, obtains a metric via the control channel representing a flow queue maintained by a neighboring node; assigns a first link weight to the maintained flow queue and stores a second link weight based on the metric for the neighboring node, and allocates a bandwidth of the data channel to send a packet from the maintained flow queue based upon the relative difference in the first and second link weights.

13. The device of claim 12, wherein the wireless transceiver communicates over a control channel and a data channel, the controller receives the metric from the neighboring node via the control channel.

14. The device of claim 12, wherein the controller receives the metric from the neighboring node via the data channel.

15. The device of claim 12, wherein the controller monitors and evaluates data communications by the neighboring node to infer the metric used to determine the link weight.

16. The device of claim 12, wherein the controller further determines a first plurality of data channel frequencies available to the subject node, ascertains a second plurality of data channel frequencies available to the neighboring node, and allocates the bandwidth of the data channel as a subset of an intersection of the first and second pluralities of data channel frequencies.

17. The device of claim 16, wherein the controller allocates the bandwidth by binding two noncontiguous frequency bands to form the bandwidth.

18. The device of claim 12, wherein the controller assigns the first and second link weights by adaptively determining a weight for locally maintained flow based on a predetermined criterion comprising an input rate for each flow, wherein the input rate r at a given time $\tau$ is derived as $r(\tau)=(tr(t)+\xi L)/\tau$ where $\xi$ is a rate-sensitivity constant, and r(t) is the input rate at a previous time t, and L is packet size, and wherein the controller allocates a portion of bandwidth to the maintained flow based on relative difference between link weights for the locally maintained flow and a neighboring flow.

19. The device of claim 12, wherein the controller receives a packet at a node, assigns a start tag to the received packet, the start tag based, at least in part, on a maximum of a time measured by a virtual clock when the packet was received and a finish tag of a previously received packet, wherein the finish tag is based, at least in part, on a start tag of the previously received packet, and the controller transmits the received packet at a time based, at least in part, on the assigned start tag, wherein transmitting the received packet comprises: attempting to transmit the received packet; assigning a back-off interval based, at least in part, on the assigned start tag minus a time measured by the virtual clock at a time when an attempt is made to transmit the received packet; and transmitting the received packet after the back-off interval has expired.

20. The device of claim 12, wherein the controller allocates the bandwidth in duration and frequency is based in part upon the difference in link weights between the subject node and neighboring node.

21. The device of claim 20, wherein the controller allocates the bandwidth in duration and frequency is based in part upon the difference in link weights between the subject node and neighboring node as adjusted by a link quality factor.

22. The device of claim 12, wherein the controller maintains a first and second flow queue for sending via the wireless data transmitter, the controller selecting a flow queue for sending a data packet based upon the queue having the higher transmission rate.

23. A computer-implemented system for distributed bandwidth allocation among a plurality of wirelessly communicating nodes of an ad hoc network, comprising:
a means for maintaining a flow queue at a subject node;
a means for obtaining a metric via a control channel representing a flow queue maintained by a neighboring for transmitting via a data channel;
a means for assigning a first link weight to the maintained flow queue and assigning a second link weight to the flow queue of the neighboring node; and
a means for allocating a bandwidth of the data channel to send a packet from the maintained flow queue based upon the relative difference in the first and second link weights adjusted by a link quality factor.

* * * * *

UNITED STATES PATENT AND TRADEMARK OFFICE
CERTIFICATE OF CORRECTION

| | | |
|---|---|---|
| PATENT NO. | : 7,778,170 B2 | |
| APPLICATION NO. | : 11/939625 | |
| DATED | : August 17, 2010 | |
| INVENTOR(S) | : Bernard D. Aboba et al. | |

It is certified that error appears in the above-identified patent and that said Letters Patent is hereby corrected as shown below:

Title Pg, Item (75), under "Inventors" column 1, line 7, delete "Raduvic" and insert -- Radunovic --, therefor.

Signed and Sealed this
Tenth Day of May, 2011

David J. Kappos
*Director of the United States Patent and Trademark Office*